US012621590B1

(12) United States Patent
    Zahir et al.

(10) Patent No.: US 12,621,590 B1
(45) Date of Patent: May 5, 2026

(54) PUSH TELEMETRY FROM EXTERNAL INTERFACE

(71) Applicant: Apple Inc., Cupertino, CA (US)

(72) Inventors: Achmed R. Zahir, Menlo Park, CA (US); Inder M. Sodhi, Palo Alto, CA (US); Tal Kuzi, Tel Aviv (IL); Helena D. O'Shea, San Diego, CA (US); Kunal K. Dave, San Jose, CA (US); Doron Rajwan, Rishon Lezion (IL); Lior Zimet, Kerem Maharal (IL)

(73) Assignee: Apple Inc., Cupertino, CA (US)

( * ) Notice: Subject to any disclaimer, the term of this patent is extended or adjusted under 35 U.S.C. 154(b) by 325 days.

(21) Appl. No.: 18/345,966

(22) Filed: Jun. 30, 2023

Related U.S. Application Data

(60) Provisional application No. 63/376,922, filed on Sep. 23, 2022.

(51) Int. Cl.
    *H04Q 9/02* (2006.01)
(52) U.S. Cl.
    CPC ........... *H04Q 9/02* (2013.01); *H04Q 2209/82* (2013.01)
(58) Field of Classification Search
    CPC .............................. H04Q 9/02; H04Q 2209/82
    See application file for complete search history.

(56) References Cited

U.S. PATENT DOCUMENTS

| | | | |
|---|---|---|---|
| 8,862,091 B2 | 10/2014 | Overby | |
| 10,712,807 B2 | 7/2020 | Pant et al. | |
| 2004/0177225 A1* | 9/2004 | Furtek | G06F 13/1657 |
| | | | 711/149 |
| 2016/0055102 A1* | 2/2016 | de Cesare | H04L 9/002 |
| | | | 713/193 |
| 2017/0220390 A1* | 8/2017 | Jain | G06F 9/524 |
| 2018/0288503 A1* | 10/2018 | Chayat | H04Q 9/00 |
| 2020/0272217 A1* | 8/2020 | Becker | G06F 1/3234 |
| 2021/0341317 A1 | 11/2021 | Tripathi et al. | |

* cited by examiner

*Primary Examiner* — Amine Benlagsir
(74) *Attorney, Agent, or Firm* — Kowert, Hood, Munyon, Rankin & Goetzel, P.C.; Scott W. Pape; Dean M. Munyon

(57) ABSTRACT

An apparatus for transmitting telemetry through an external interface is disclosed. An integrated circuit includes at least one interface circuit configured to communicate on an external interface of the integrated circuit with a plurality of other integrated circuits. The integrated circuit further includes a first control circuit coupled to the at least one interface circuit, a first table circuit. The first control circuit is configured to store telemetry data transmitted by the plurality of other integrated circuits over the external interface in respective table entries of the first table circuit, based on which of the plurality of other integrated circuits transmitted the telemetry data.

19 Claims, 13 Drawing Sheets

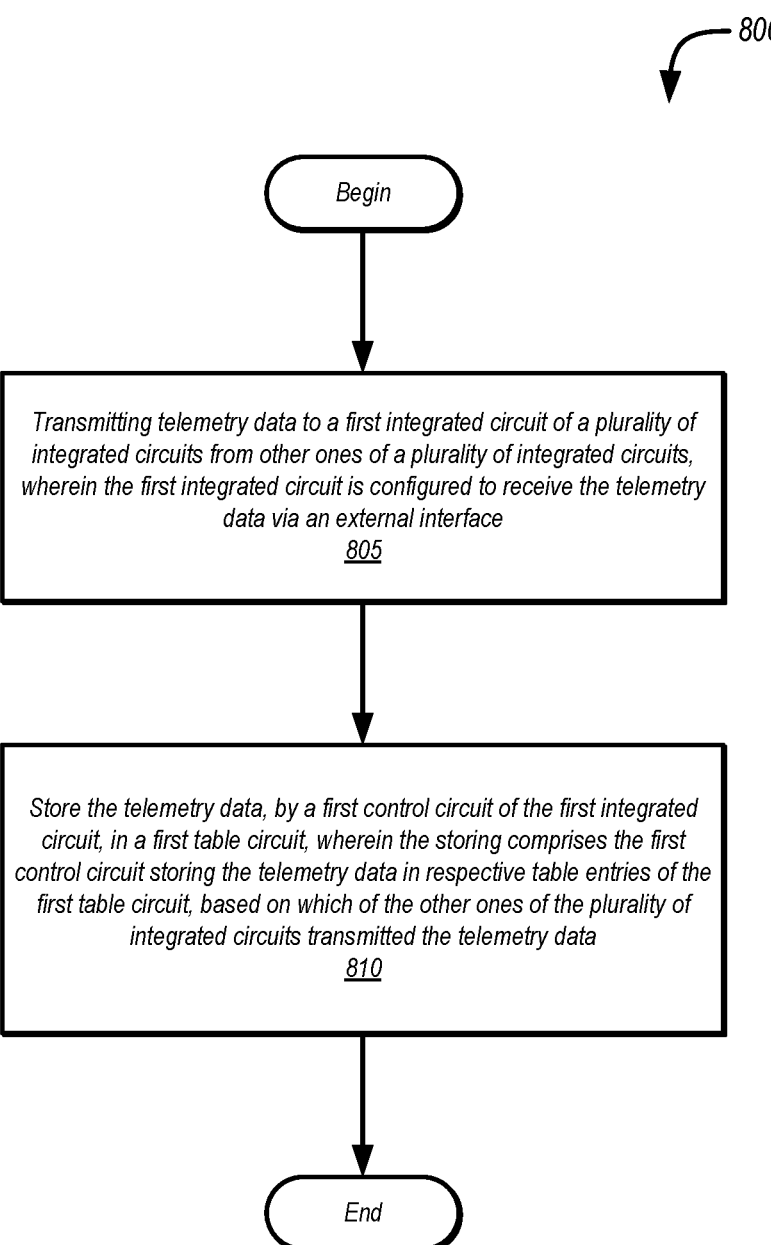

*800*

Begin

Transmitting telemetry data to a first integrated circuit of a plurality of integrated circuits from other ones of a plurality of integrated circuits, wherein the first integrated circuit is configured to receive the telemetry data via an external interface
805

Store the telemetry data, by a first control circuit of the first integrated circuit, in a first table circuit, wherein the storing comprises the first control circuit storing the telemetry data in respective table entries of the first table circuit, based on which of the other ones of the plurality of integrated circuits transmitted the telemetry data
810

End

PUSH TELEMETRY FROM EXTERNAL INTERFACE

PRIORITY

The present application claims priority to U.S. Provisional App. No. 63/376,922, entitled "Push Telemetry from External Interface", filed on Sep. 23, 2022, the disclosure of which is incorporated by reference herein in its entirety.

BACKGROUND

Technical Field

The present disclosure is directed to electronic systems and, more particularly, to recording telemetry data in an electronic system.

Description of the Related Art

Telemetry data from various components in a digital system can be used by various control loops to determine states at which various components should operate (e.g., on, off, or various performance states), whether the system as a whole should sleep to conserve power, and so on. Telemetry data can include data such as temperature values, voltage readings (e.g., a level of a supply voltage at which a circuit is operating), performance related metrics (e.g., a processing workload), and other information. Using the telemetry information, operation of the digital system may be optimized. Optimizing the operation of the digital system may include conserving power to remain within a given power budget, maintaining temperature to remain within thermal limits, and increasing the performance (in terms of instructions executed) per watt of power expended, among other possibilities.

SUMMARY

An apparatus for transmitting telemetry through an external interface is disclosed. In one embodiment, an integrated circuit includes at least one interface circuit configured to communicate on an external interface of the integrated circuit with a plurality of other integrated circuits. The integrated circuit further includes a first control circuit coupled to the at least one interface circuit, a first table circuit. The first control circuit is configured to store telemetry data transmitted by the plurality of other integrated circuits over the external interface in respective table entries of the first table circuit, based on which of the plurality of other integrated circuits transmitted the telemetry data.

In various embodiments, the integrated circuit further includes a plurality of component circuits and a second control circuit comprising a second table circuit. The second control circuit is configured to store, in the second table circuit, telemetry data transmitted from ones of the plurality of component circuits. Ones of the plurality of component circuits and the second control circuit are included in one or more power domains of the integrated circuit that are selectively powered on and off during a time that the integrated circuit receives power. The first control circuit and the interface circuit are included in a second power domain that operates at any time that the integrated circuit receives power.

BRIEF DESCRIPTION OF THE DRAWINGS

The following detailed description makes reference to the accompanying drawings, which are now briefly described.

2

Figure 1:
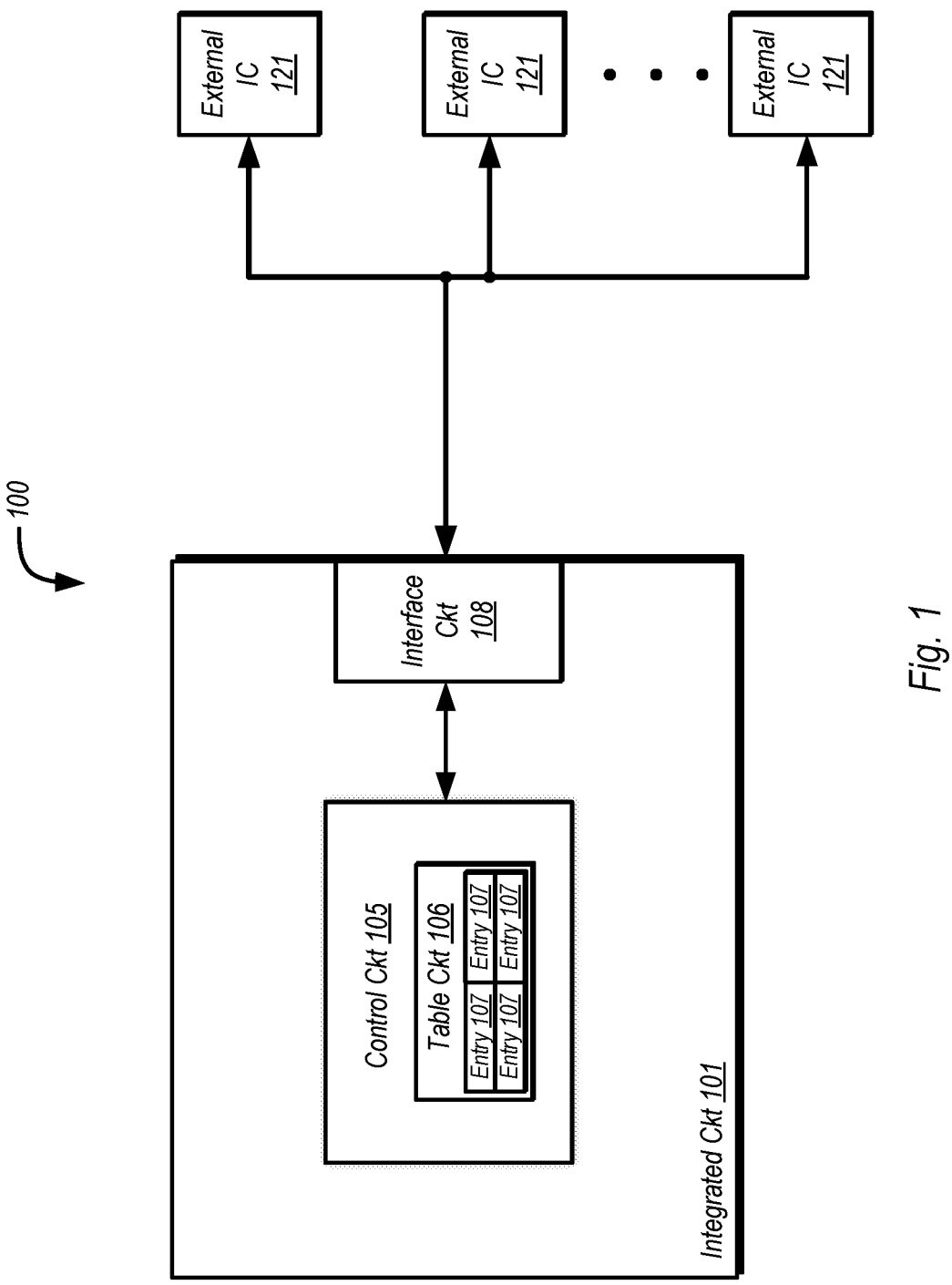

FIG. 1 is a block diagram of one embodiment of a system including an integrated circuit (IC) coupled to a plurality of external ICs.

Figure 2:
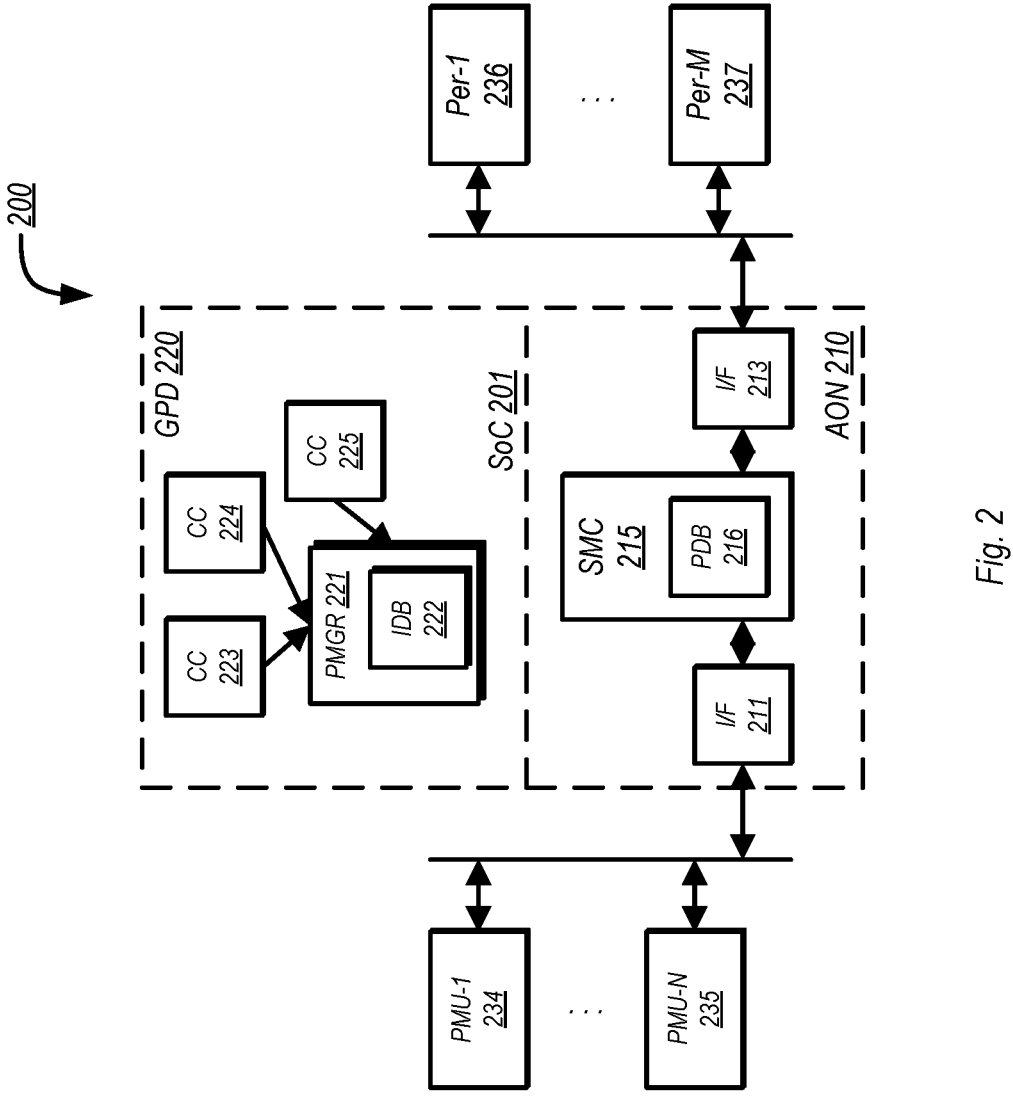

FIG. 2 is a block diagram of one embodiment of a system-on-a-chip (SoC).

Figure 3:
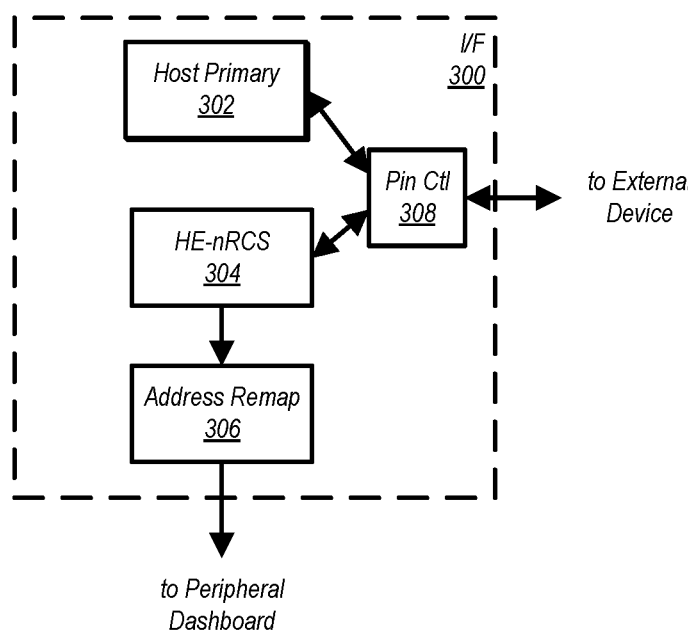

FIG. 3 is a block diagram of one embodiment of an interface circuit.

Figure 4:
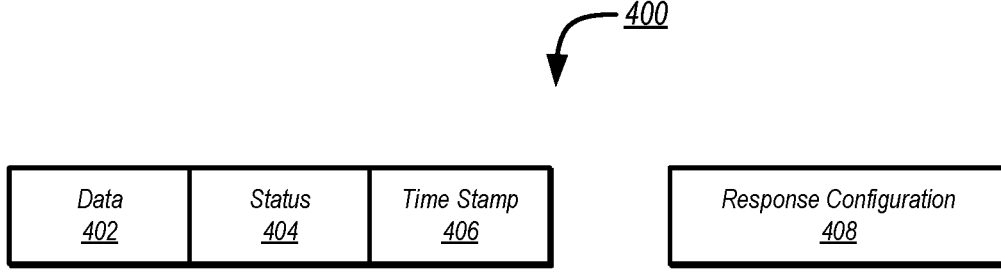

FIG. 4 is a block diagram illustrating a dashboard entry for one embodiment of a dashboard circuit.

Figure 5:
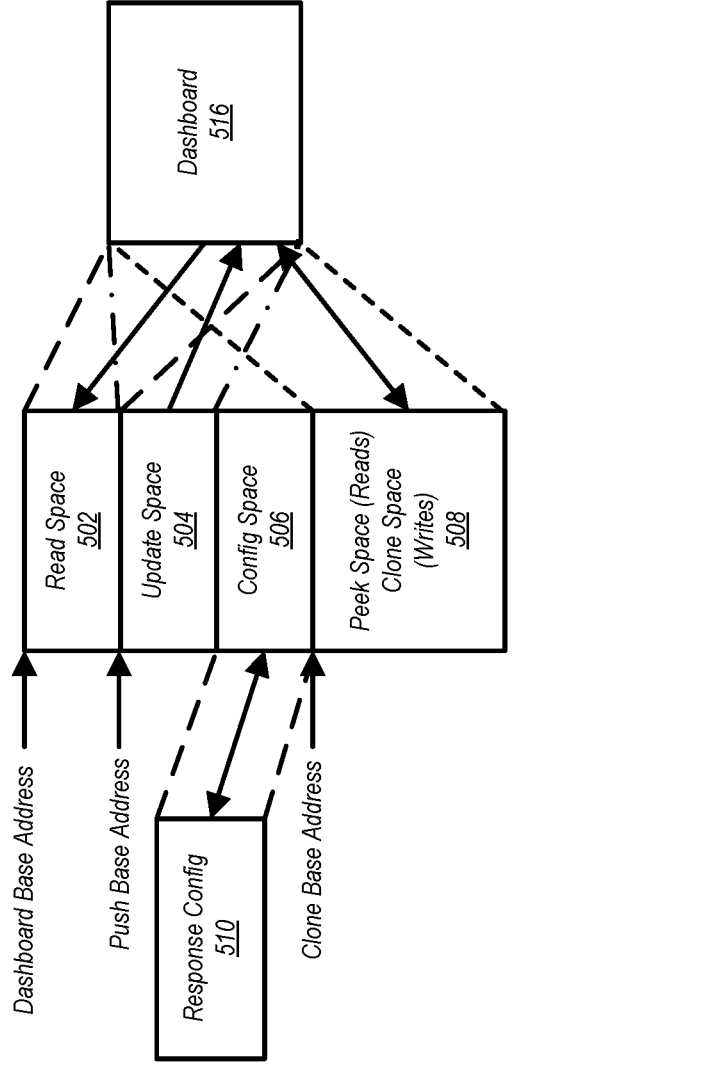

FIG. 5 is a block diagram of one embodiment of an address space associated with the dashboard.

Figure 6:
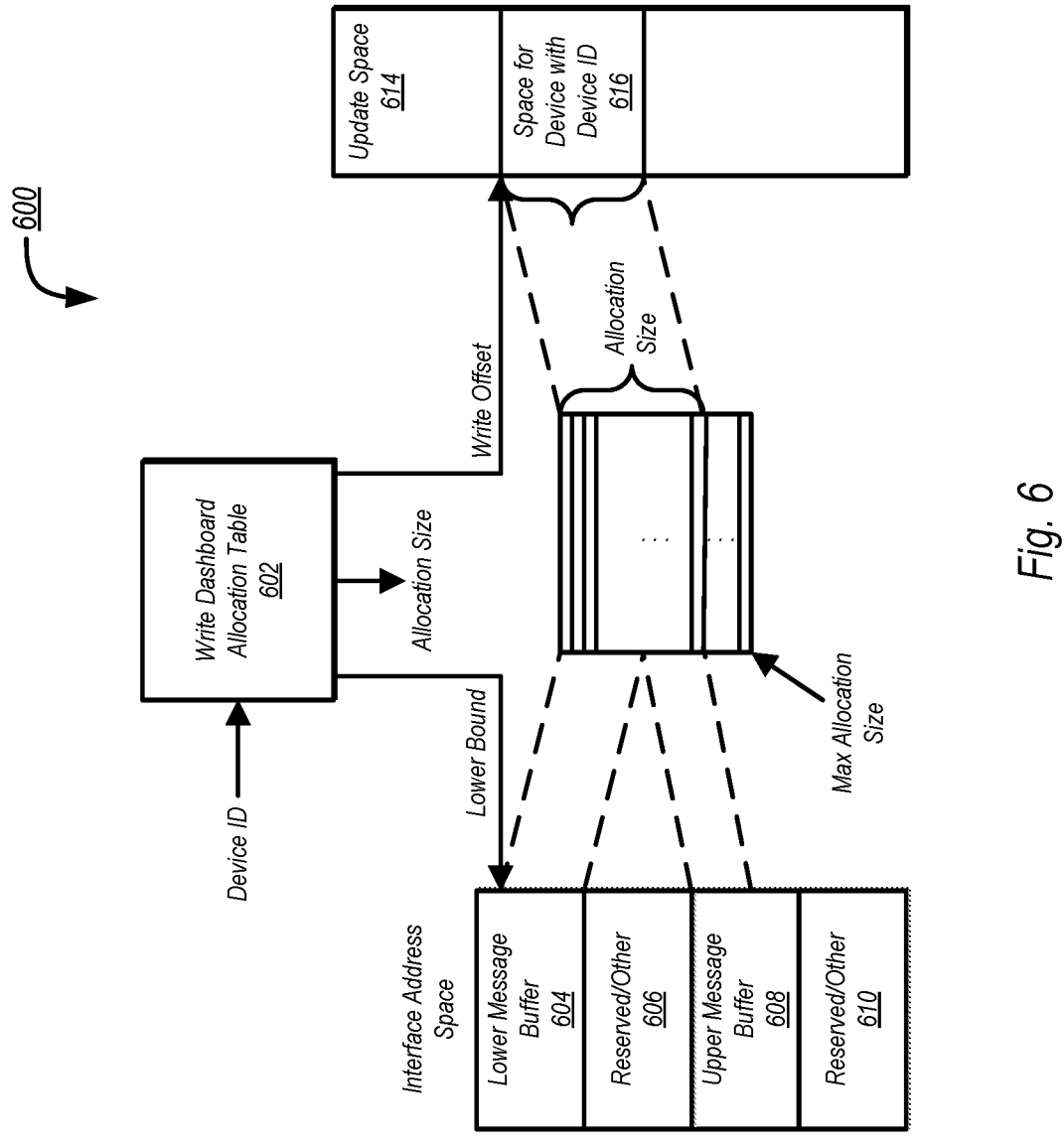
Figure 7:
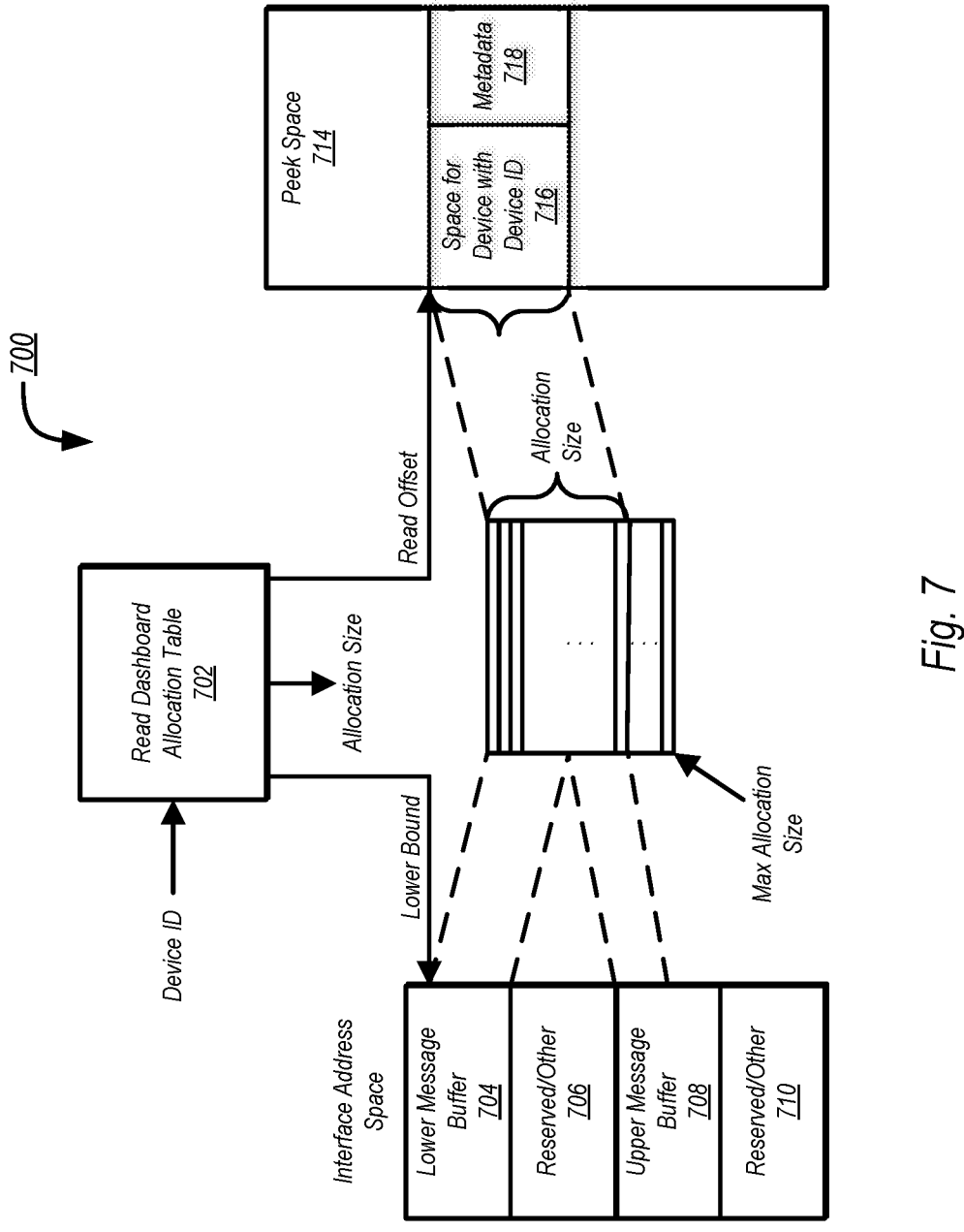

FIG. 6 is a block diagram of one embodiment of an address remap circuit shown during write operations FIG. 7 is a block diagram of one embodiment of an address remap circuit shown during read operations.

FIG. 8 is a flow diagram of one embodiment of a method for operating a system in which telemetry data is pushed from a number of ICs to a central location.

Figure 9:
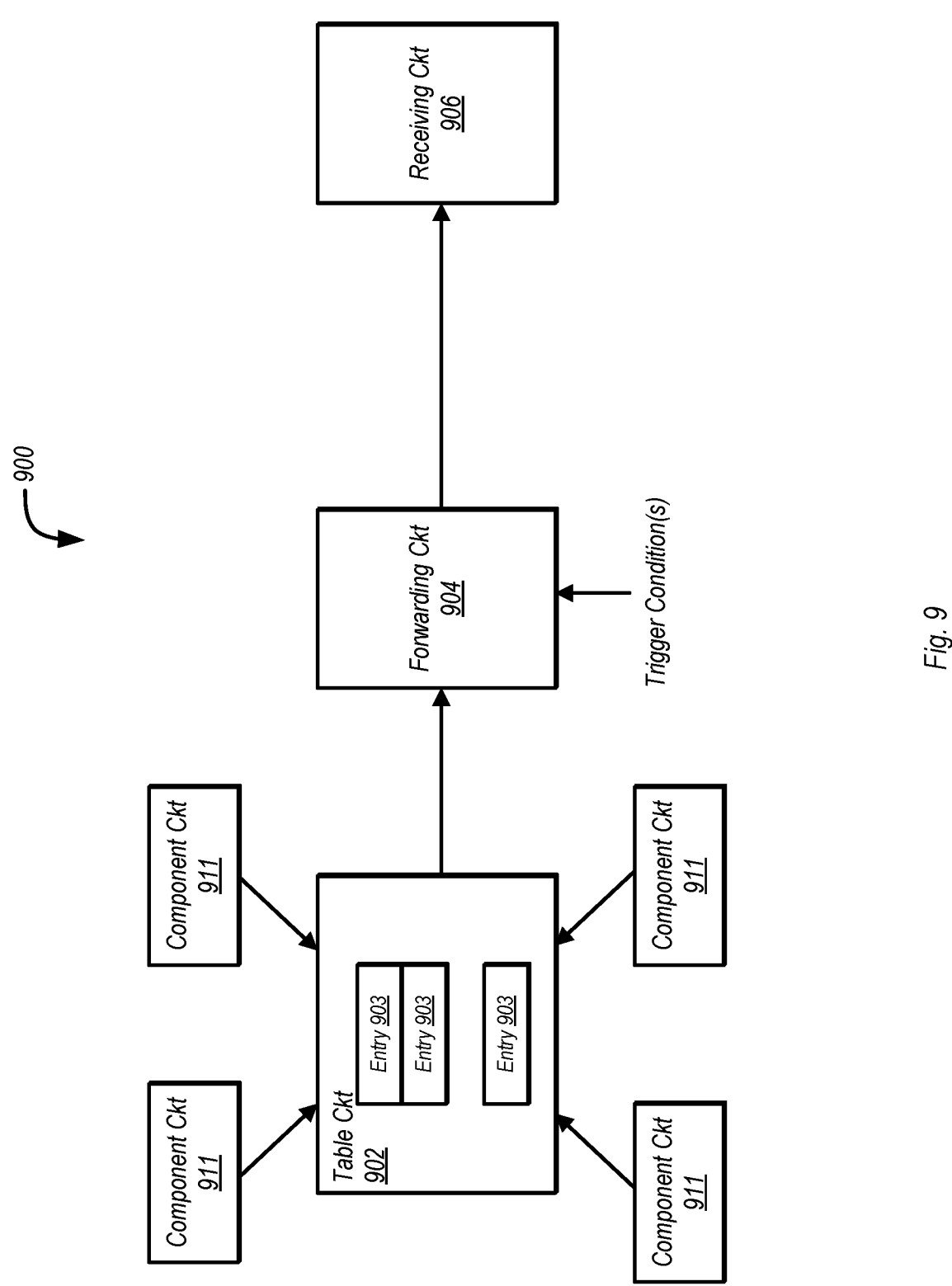

FIG. 9 is a block diagram of one embodiment of a system including a forwarding circuit for conveying telemetry data to a receiving circuit.

Figure 10:
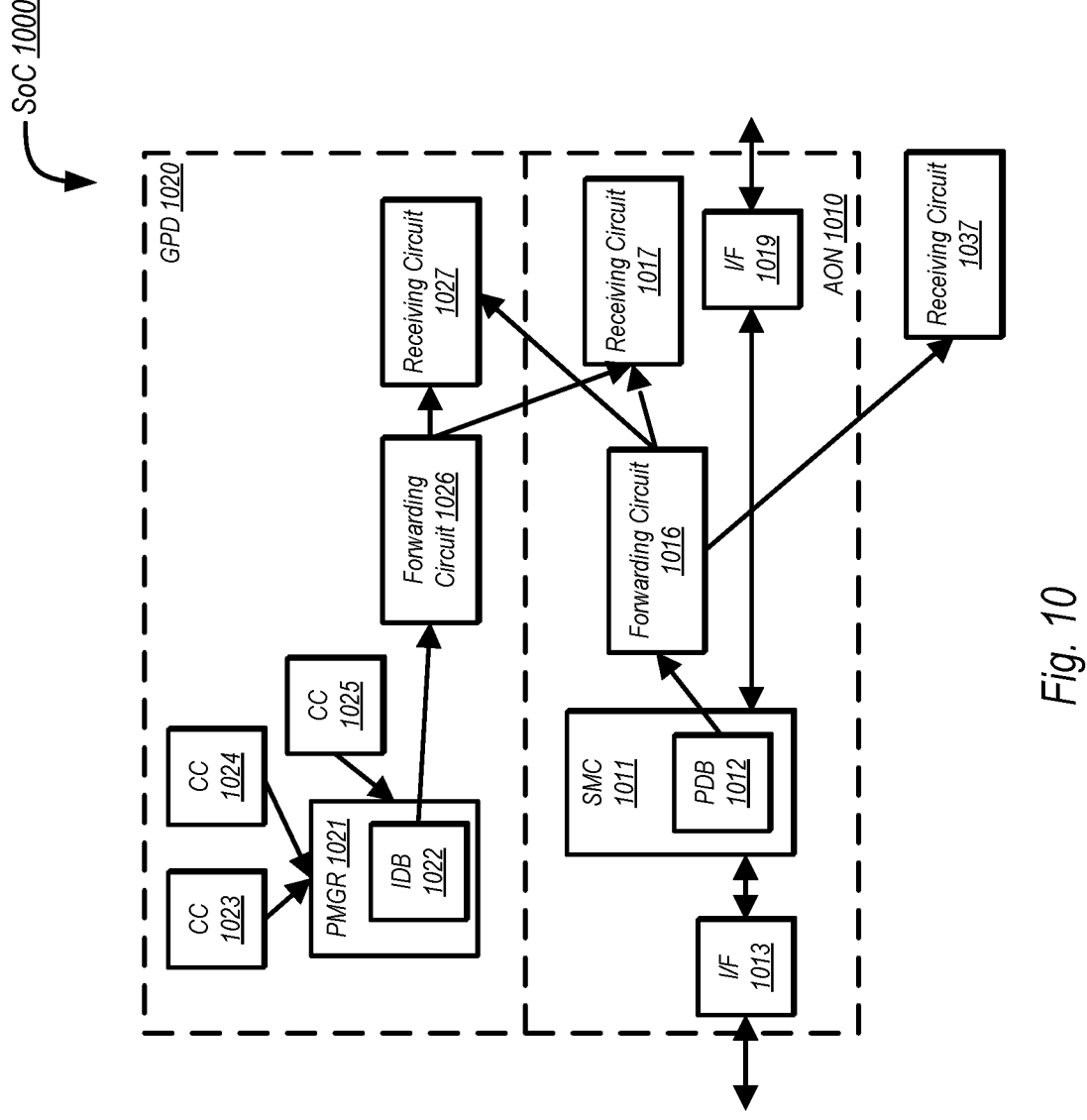

FIG. 10 is a block diagram of one embodiment of a system on a chip (SoC) with forwarding circuits from the dashboards.

Figure 11:
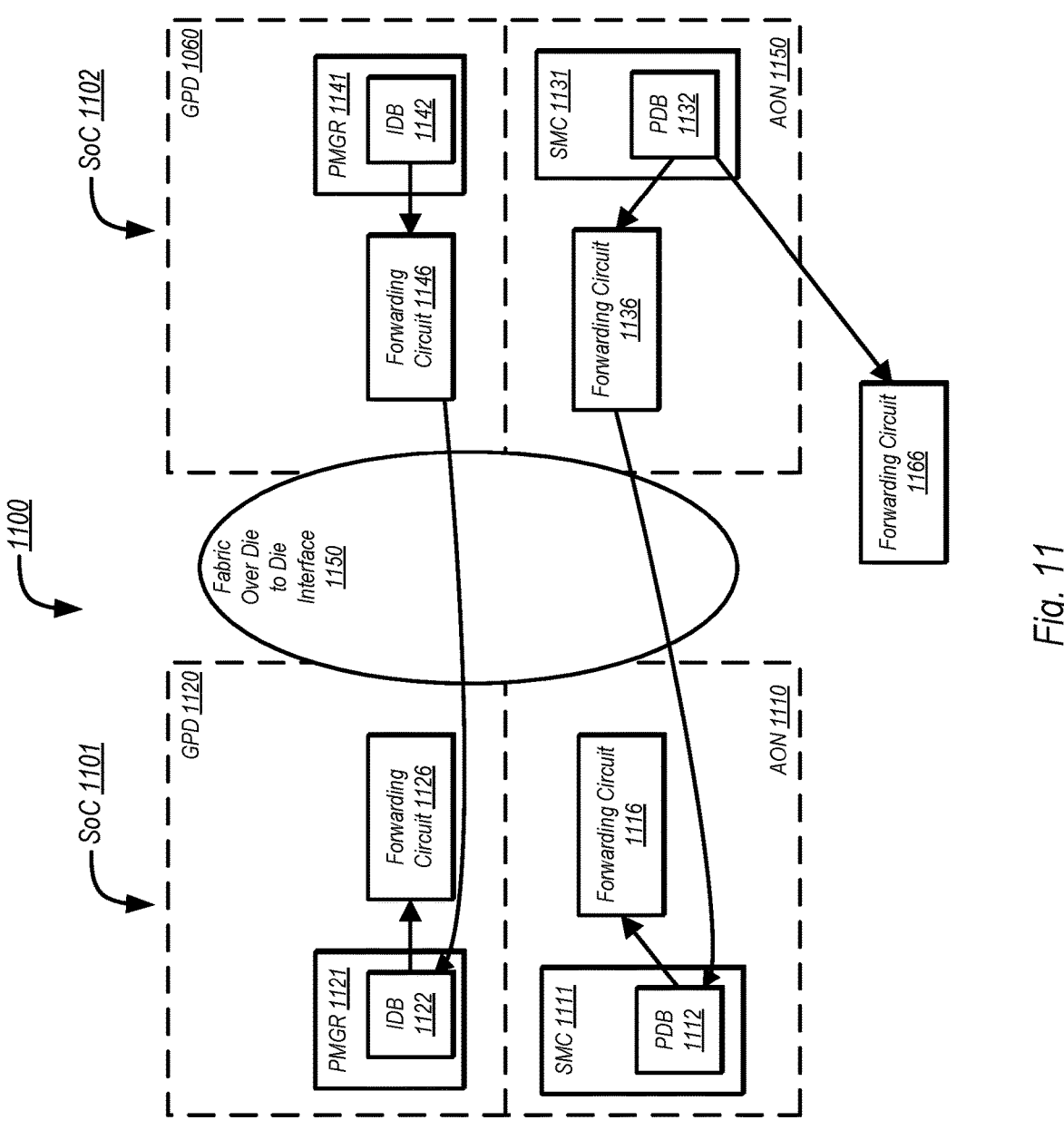

FIG. 11 is a block diagram of an embodiment of a system having multiple ICs with forwarding circuits.

Figure 12:
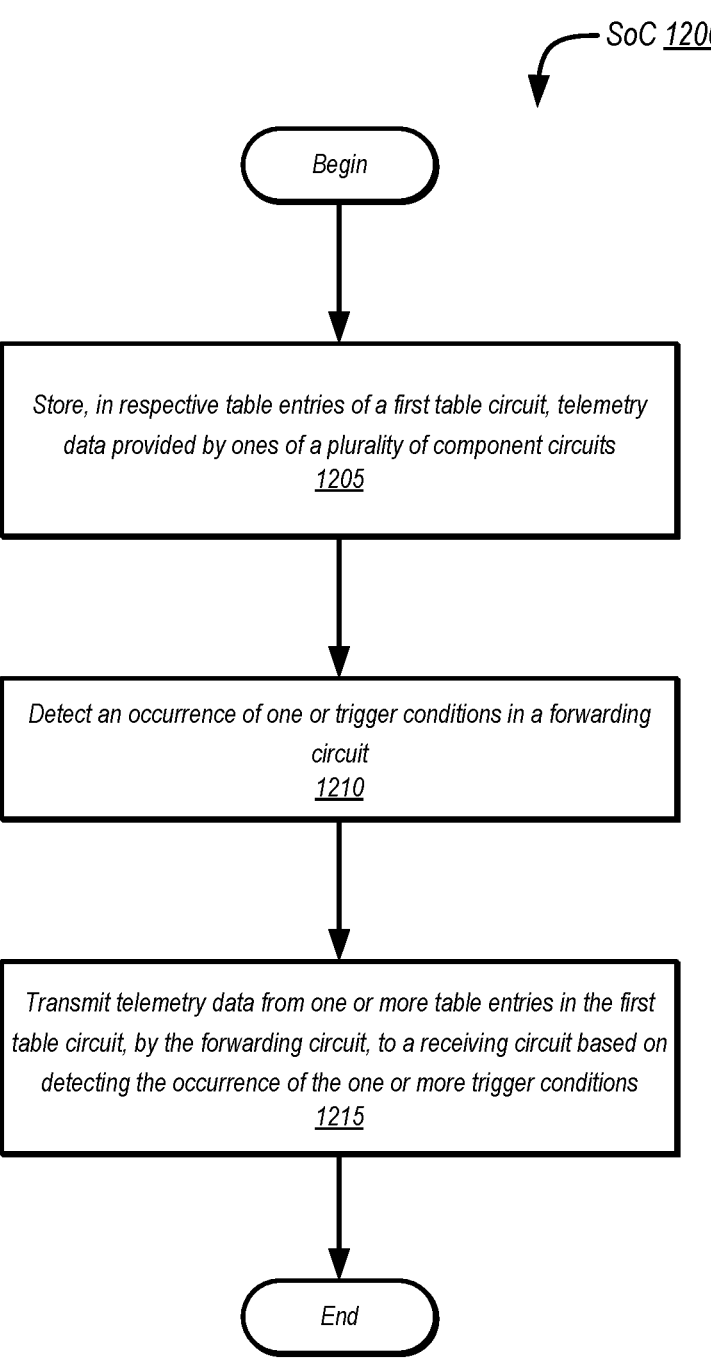

FIG. 12 is a flow diagram of one embodiment of a method for operating a system in which at least one IC includes a forwarding circuit.

Figure 13:
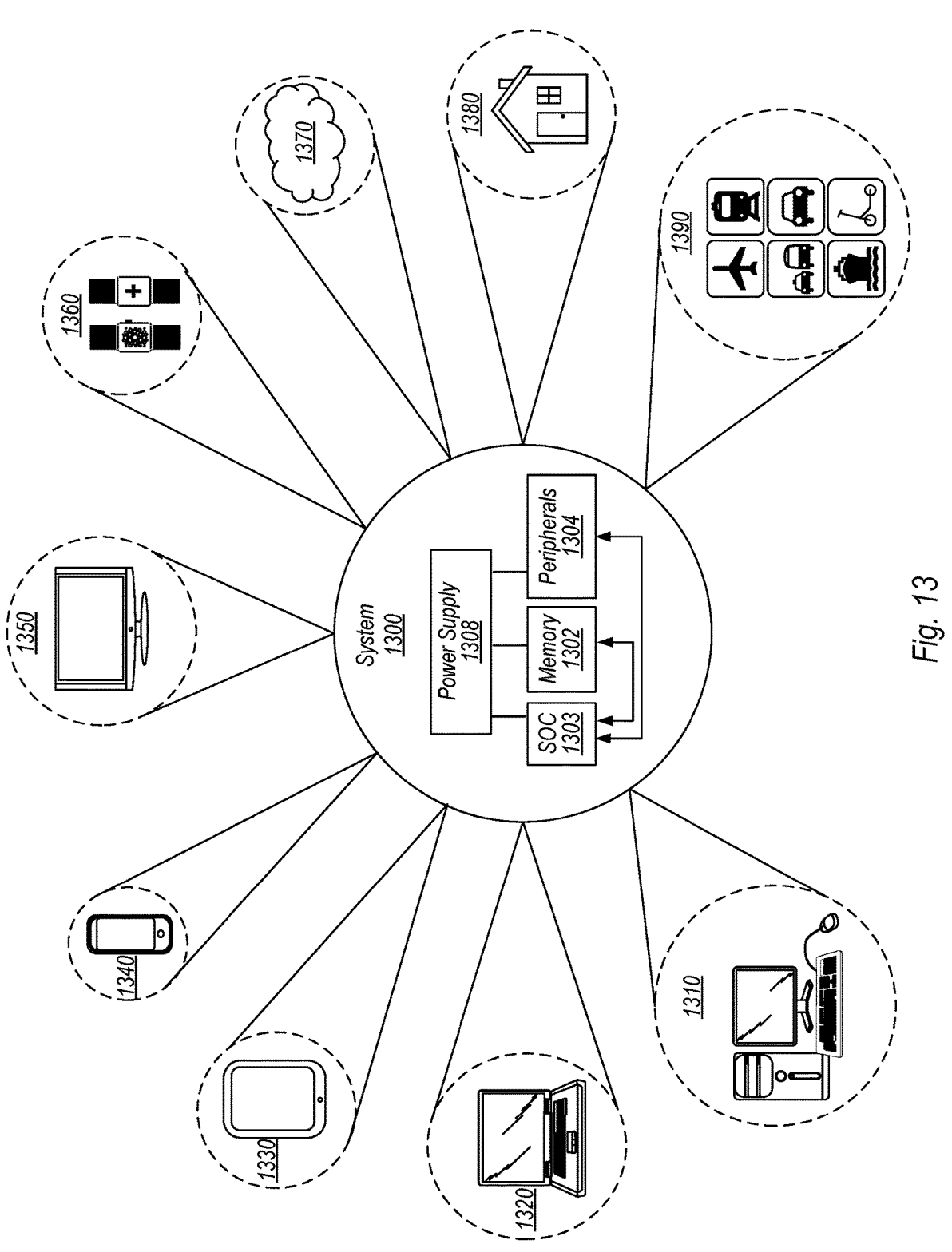

FIG. 13 is a block diagram of one embodiment of an example system.

Figure 14:
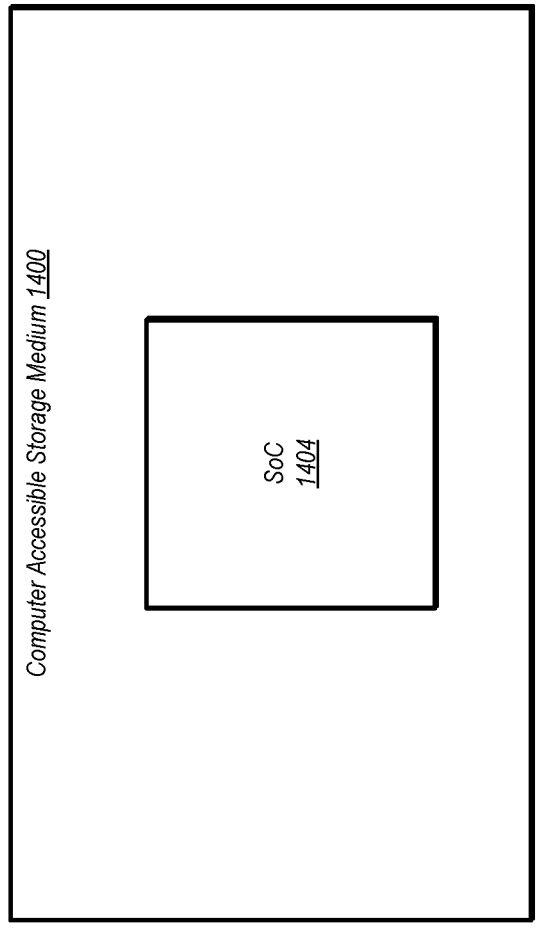

FIG. 14 is a block diagram of one embodiment of a computer accessible storage medium.

DETAILED DESCRIPTION OF EMBODIMENTS

Various electronic systems include multiple component circuits, which may in some cases be implemented on integrated circuits. These component circuits may accumulate telemetry data that can be used by a power manager in control loops. The power manager may be implemented on a particular one of the integrated circuits, which may obtain the telemetry data from other ones of the component circuits or other integrated circuits. However, there can be significant latency in obtaining the telemetry data by the power manager in which the control loops are managed. This can be exacerbated by the power manager being in an area of an integrated circuit that can be put in a sleep mode. Thus, when telemetry data is received from another circuit component or integrated circuit, it can result in the need for a wakeup and determining the source of the telemetry data after an interrupt is generated. In some cases, the telemetry data may be received based on polling various other ones of the component circuits/integrated circuits, which can also require a wakeup.

Some integrated circuits include an always-on section. As defined herein, a section of an integrated circuit may be considered as an always-on section if the circuits therein operate any time the integrated circuit is receiving power. Thus, circuits may be implemented in an always-on section to which telemetry data may be pushed by various other ones of the integrated circuits of the electronic system.

Accordingly, the present disclosure is directed to a system in which devices (e.g., integrated circuits) external to a particular integrated circuit (e.g., a system-on-a-chip, or SoC) or portion thereof can push telemetry data to a table circuit (which is also referred to herein as a dashboard; the terms are interchangeable) in an always-on section of the latter. This allows telemetry received from circuits in other areas of the integrated circuit or external thereto be stored within a table circuit of the dashboard even if the remainder of the integrated circuit is currently in a sleep state. For example, a mechanism to share pins on a system peripheral management interface (SPMI) bus may be provided. The mechanism may share the SPMI pins with a primary host controller to allow the dashboard to receive pushed telemetry data. An address remap circuit may be provided to remap SPMI addresses to dashboard addresses. The dashboard may also be used to exchange data between devices external to the integrated circuit.

Telemetry data as defined herein refers to the information that is collected by an electronic system (e.g., one having multiple chips), a system-on-a-chip, or other integrated circuit about its own performance and/or about the environment in which it is operating. This data is often transmitted to a specific location for monitoring and analysis, as well as for performing control functions (e.g., such as controlling thermal output, power consumption, the assignment of processing workloads, etc.). Telemetry data can include a wide range of information types, such as temperature, pressure, voltage, current, and other types of sensor readings. It can also include information about the system's overall health and performance, such as error codes, diagnostic data, and status updates, instructions executed per unit of power consumed, and so on. In general, telemetry data is defined as any data used to provide insight into the functioning of the electronic system, to help identify potential problems or areas for improvement, and/or to perform control functions to maintain operation within specified limits.

As used herein, an "integrated circuit" or "IC" refers to circuitry that is formed on a single semiconductor substrate or "chip."

For systems having a number of integrated circuits, there may be a separate dashboard implemented one multiple ones of these circuits. Similar to the embodiments discussed above, the managing of control loops may be carried out on one of these integrated circuits. However, collecting data by one integrated circuit from a number of others may be a high latency operation, particularly when polling is used. Accordingly, various ones of the integrated circuits may include a respective forwarding circuit. The forwarding circuit may be configured to (e.g., by programming or other mechanism) to forward telemetry data to various other destinations within the system, including another dashboard on another integrated circuit, a USB interface, or more generally, any suitable set of targets. A clone space may be added to the dashboard address space, and writes to the clone space and update the dashboard at the desired destination. Thus, a clone space on one particular integrated circuit die can be written by a forwarding circuit on another integrated circuit die, thereby replicating data from the source dashboard and placing all data in a single location at the destination dashboard.

The various mechanisms disclosed herein may allow for more fine-grained control of the various control loops that use telemetry data. The latency at which telemetry data is provided may be reduced. The use of the forwarding circuits may allow for the elimination of polling that would otherwise be used to retrieve telemetry data.

Embodiments of a system as disclosed herein are now described in further detail. The discussion begins with embodiments of a system that includes at least one table circuit for storing telemetry data from a number of different component circuits. Discussion of various aspects of table entries and addressing follow. A flow diagram illustrating a method of operating a system with push telemetry is then discussed. Following that, systems having forwarding circuits for push telemetry are then described, including embodiments of an SoC as well as a system with multiple forwarding circuits follows. A method for operating a system with forwarding also discussed. The disclosure also includes a description of example systems which may implement various aspects of the disclosure, as well as a computer readable medium that may store an electronic representation of an SoC for use in, e.g., manufacturing the same.

System with Push Telemetry Via External Interface Circuit:

FIG. 1 is a block diagram of one embodiment of a system in which telemetry data is pushed to a table circuit via an external interface. In the embodiment shown, system 100 includes an IC 101 that is coupled to a number of external ICs 121. IC 101 includes a control circuit 105, which itself includes a table circuit 106. The control circuit 105 is coupled to an interface circuit 108, which provides an interface between IC 101 and the external ICs 121. IC 101 may be one of a number of different types of ICs, such as an SoC, a processor, a microcontroller, an application specific integrated circuit (ASIC), or other type. The external ICs 121 may be any type of IC that may communicate with IC 101, including ICs implemented in various peripheral devices coupled thereto. Embodiments including an external IC 121 that is another instance of IC 101 are also possible and contemplated. For example, one embodiment of a system may include two or more instances of an SoC, with one of the instances being designated as the primary SoC while the other instances are designated as secondary SoCs.

The control circuit 105 is coupled to interface circuit 108, and is configured to receive telemetry data that is transmitted by the various ones of the external ICs 121. It is noted that in various embodiments, the external ICs 121 may "push" telemetry data to IC 101, rather than waiting to be polled thereby. Control circuit 105 includes table circuit 106, which is configured to store the telemetry data that is transmitted by the various external ICs 121. The table circuit 106 in the embodiment shown includes a number of respective table entries 107 configured to store telemetry data received from external ICs 121. The storing of telemetry data in respective table entries 107 of table circuit 106 may be based on the particular external ICs 121 from which the telemetry data was received. The mapping of addresses within table circuit 106 will be discussed in further detail below.

FIG. 2 is a block diagram of another embodiment of a system having an SoC, a number of peripherals, and power management circuitry. In the embodiment shown, system 200 includes system-on-a-chip (SoC) 201, which may be one type of IC per the system embodiment of FIG. 1. SoC 201 in the embodiment shown includes an always-on (AON) portion 210 and a gate-able power domain (GPD) 220. The AON portion 210 is an unswitched power domain in which the circuitry therein is configured to continue operating any time SoC 201 is receiving power from a source external thereto ("always on"). GPD 220 is a switchable power domain, and may be one of a number of power domains on SoC 201 for which circuitry may be selectively powered on or off (e.g., powered off when idle to conserve power) while SoC 201 is otherwise receiving power.

System 200 also includes a number of peripherals, including Peripheral 1 236 and Peripheral M 237. Generally speaking the number of peripherals may vary from one embodiment to another, with any suitable number being provided. The peripherals may include respective ICs that gather telemetry data and push this data to SoC 201. The peripherals may include a number of different types of functional devices, such as various radio circuits, network interface circuit, display circuits, and so on.

System 200 in the embodiment shown also includes a number of power management units (PMUs), including PMU-1 234 and PMU-N 235 as shown here. These PMUs may carry out various power management functions for the system, including the supplying of power at specified voltage and current levels to the various circuits of system 200. The PMUs shown here may push telemetry data to SoC 201, and may also be part of control loops that carry out various power management functions based on the telemetry data.

AON portion 210 in the embodiment shown includes interface circuits 211 and 213 and a system management circuit (SMC) 215 that includes a peripheral dashboard (PDB) 216, which is an example of a table circuit. PDB 216 may store telemetry data transmitted to SoC 201 from various ones of the peripherals 236 and 237 (and more generally, any peripherals coupled to SoC 201) as well as telemetry data transmitted by PMUs 234 and 235 (and more generally, any PMUs coupled to SoC 201). PDB 216 may store telemetry data generated by these external integrated circuits. For example, PDB 216 may store telemetry data from the PMU's that supply power to the SOC and other integrated circuits in the system (e.g., PMU-1 to PMU-N). The PDB may also store telemetry data from one or more peripheral integrated circuits (e.g., Per-1 to Per-M), and may also store telemetry data from (or generated by) software agents. The peripheral integrated circuits may include wireless communication chips (or radio chips), networking chips, etc. The AON domain of the SOC may also include one or more interface circuits (I/F) configured to communicate with the external integrated circuits.

GPD 220 in the embodiment shown includes a power manager circuit (PMGR) 221, which may carry out various control functions for on-chip power management within GPD 220 and any other switchable power domains of SoC 201. PMGR 221 includes an internal dashboard (IDB) 222, which may be used to store telemetry data from component circuits within GPD 220, and more generally, from component circuits within any switchable power domain of SoC 201, as well as from various software agents executing within the system (e.g., software that utilizes hardware-generated telemetry to compute power consumption, etc.). In the embodiment shown, GPD includes component circuits (CCs) 223, 224, and 225. More generally, CCs may be implemented throughout the various switchable power domains of SoC 201. Such circuits may includes processor cores of various types (e.g., optimized for performance or power efficiency), graphics processing circuits, various switching circuits forming an on-chip network or fabric, and any other type of component circuit that may be implemented on an SoC. These component circuits may forward telemetry data to PMGR 221, which may then store this data in the table circuit that forms IDB 222. PMGR 221 may use this telemetry data to carry out various control functions, such as the allocation of processing workloads among a number of processor cores.

FIG. 3 is a block diagram of one embodiment of an interface circuit such as those discussed above in reference to FIGS. 1 and 2. In the illustrated embodiment, interface circuit 300 includes a pin control circuit 308 coupled to the external interface, a host primary circuit 302 coupled to the pin control circuit, a host-embedded, non-request capable secondary circuit (HE-nRCS) 304 coupled to pin control circuit 308, and an address remap circuit 306 coupled to He-nRCS circuit 304 and to the PDB (not shown in this drawing).

Host primary circuit 302 in the embodiment shown carries out control of the external interface. In one embodiment, interface circuit 300 is configured to carry out communications in accordance with the system management peripheral interface (SPMI) protocol. Other protocols are also possible and contemplated. Under control of host primary circuit 302, interface circuit 300 may synchronize the transfer of data (such as telemetry data) between the IC in which it is implemented (the primary devices) and a number of external ICs (secondary devices, e.g., ICs implemented in peripheral devices). A number of secondary devices may be supported, with each of the secondary devices having a unique address with respect to the others.

HE-nRCS circuit 304 in the embodiment shown may be a target for write operations from the various external integrated circuits that comprise the secondary devices. These write operations may carry telemetry data to be written to a table circuit, such as PDB 216 as shown in FIG. 2. Since HE-nRCS circuit 304 is non-request capable in the embodiment shown, it acts only as a receiver and does not initiate requests to devices external to the IC in which it is implemented. However, HE-nRCS circuit 304 as shown here may respond to both inbound read and write requests. Embodiments of an interface circuit that include a request-capable circuit in lieu of HE-nRCS circuit 304 are also possible and contemplated.

In carrying out the various synchronization functions with host primary circuit 302, pin control circuit 308 in the embodiment shown is configured to manage sharing of the pins on the external interface between host primary circuit 302 and the HE-nRCS circuit 304. This may include allocating pins to host primary circuit 302 when a command or request is to be sent from interface circuit 300 to an external device.

Address remap circuit 306 in the embodiment shown is configured to generate an address within the address space of a table circuit entry (such as and entry to PDB circuit 216) that is to be updated by a write transaction (or to be read by a read transaction, in the data sharing case). The address remap circuit 306 may generate the address based on an identifier of the external integrated circuit that initiated the transaction.

In generating addresses, address remap circuit 306 may distinguish between the types of transactions. In response to receiving a write transaction, address remap circuit 306 is configured to map the address to the entry in an update portion of an address space mapped to a correspondingly coupled table circuit. The entry may be updated in response to the address to the entry being mapped to the update portion. In response to receiving a read transaction, address remap circuit 306 is configured to map the address to the entry in a peek portion of the address space of the first table circuit. Entries in the peek portion of the address space are readable without causing an update to a status field of the entry (the structure of entries for various embodiments is discussed in further detail below).

Table Entries and Addressing:

FIG. 4 is a block diagram illustrating one embodiment of a table circuit entry and corresponding response configuration information. In the embodiment shown table entry 400 includes a data field 402 for storing the telemetry data. A status field 404 indicates validity of the data field, and may also include other status data related to, e.g., the source of the telemetry data, etc. Status field 404 may also include a "new" bit that is set whenever an entry is updated, and cleared when that entry is read, thereby allowing an observer to determine whether the data it new or stale (previously read). A "dropped" bit may also be provided to indicate there has been more than one update since the last read (and thus indicating to an observer that it has missed an intervening update). A time stamp field 406 is used to indicate a time at which the data was written to the entry.

A response configuration field 408 is also shown. In some embodiments, this field is not necessarily associated with a particular entry, but rather, is used to indicate how the table circuit (dashboard) is to respond to a write to the data field (e.g., by invoking an interrupt to a processor). Embodiments are possible and contemplated in which a response configuration field 408 is associated with a particular entry, with different entries having different responses to writes to the data field.

The entry may include a data field for the telemetry data, a status field indicating validity of the data field and possibly other status data, and a time stamp field recording a time stamp at which the data was written. The response configuration field may not be part of the table circuit entry, but may be programmed with data indicating how the table circuit responds to a write to the data field (e.g., interrupting a processor).

FIG. 5 is a block diagram illustrating the address space for one embodiment of a dashboard. The address space includes multiple regions, each of which maps to a dashboard (e.g., offsets within the regions may map to different dashboard entries), with the exception of a configuration space that maps to the response configuration corresponding to the dashboard. The offsets for the particular embodiment shown includes a dashboard base address, a push base address, and a clone base address.

In the embodiment shown, the address space includes a read space 502, an update space 504, a configuration space 506, and a peek space 508. It is noted that the order of these spaces as shown here is illustrated by way of example, although the order may be different in other embodiments. Read space 502 in the embodiment shown is used by consumers of the telemetry data within the SoC (e.g., control loops). Reading an entry via read space 502 may cause an update to the status field of the entry. For example, if the telemetry data that is read via read space 502 is used in a control loop, the status may, subsequent to reading, be modified from new to stale (or "not new"). The read space 502 in the embodiment shown begins with the dashboard base address.

Update space 504 in the embodiment shown is used by write transactions pushing telemetry data to the dashboard. The telemetry data may be written to an assigned table circuit entry via the update space. When telemetry data is written via the update space, the status field of a corresponding entry in the dashboard may be updated. The update space 504 in the embodiment shown begins with the push base address.

Peek space 508 in the embodiment shown is used to read the dashboard without causing updates to the status field. The peek space 508 may be used, e.g., by other external ICs to read a given external integrated IC's telemetry data from the dashboard. For example, an IC associated with a wireless transceiver may read the telemetry data provided by an IC of a network interface, or vice versa. The peek space 508 in the embodiment shown begins with the clone base address. As will be discussed below, the clone space (which is included as part of peek space 508) may be used for writes from the dashboard of a secondary IC to the dashboard of a primary IC.

The response configuration 510 shown in FIG. 5 comprises information read from configuration space 506. This information indicates how the control circuit that includes the dashboard is to respond to, e.g., a write to a data field of a particular entry. For example, the response may include invoking an interrupt in a processor on the same SoC or from another SoC in the system.

FIG. 6 is a block diagram illustrating operation of an address remap circuit 600, which may correspond to the address remap circuit discussed above in reference to FIG. 3, during write transactions (e.g., telemetry data pushed from an external IC to a dashboard in the primary IC).

As shown in FIG. 6, the device ID (an identifier of the external IC that initiated a write transaction to the SoC) may index into a write dashboard allocation table 602. Based on the device ID, the write dashboard allocation table 602 may output a lower bound for the interface address space, an allocation size, and a write offset. The interface address space as shown herein includes a lower message buffer 604, an upper message buffer 608, along with reserved/other portions 606 and 610.

The allocation size determines the size of the mapped region, e.g., the number of table entries assigned to the external interface circuit from which the telemetry data has been pushed. The lower bound in the embodiment shown determines the address that writes use to target the first entry for the given device ID. Beginning at the lower bound, addresses may map to consecutive entries in the portion corresponding to the allocation size. The write offset may specify the offset from the base address of the update space 614 to the initial entry writeable by the external integrated circuit. The space 616 reserved for the particular device ID then extends from the address indicated by the write offset up plus a number of addresses corresponding to the allocation size. Consecutive entries after the initial entry up to the boundary corresponding to the allocation size may thus be written by the external IC, into the space 616 designated for the particular device ID of update space 614.

FIG. 7 is a block diagram illustrating operation of an address remap circuit 700, which may correspond to the address remap circuit discussed above with reference to FIG. 3, during read transactions initiated by an external IC from the dashboard of another IC (e.g., initiated from a secondary IC to read data from a dashboard in a primary IC). For example, the operation shown here may occur during data exchange between two or more external ICs). The interface address space as shown herein includes a lower message buffer 704, an upper message buffer 708, along with reserved/other portions 706 and 710.

As shown in FIG. 7, a device ID provided by the initiating device may index into read dashboard allocation table 702. Based on the device ID, read dashboard allocation table 702 may output a lower bound for the interface address space, an allocation size, and a read offset. The allocation size may specify the number of table entries readable by the external interface circuit to which read data is to be provided. Beginning at the lower bound, addresses may map to consecutive entries in the allocation size. The read offset may specify the offset from the base address of the peek space 714 to the initial entry readable by the external integrated circuit. Consecutive entries after the initial entry up to the allocation size may also be readable by the external integrated circuit. The read offset and allocation size define a space 716 associated with the device ID. As illustrated in FIG. 7, the reads may only be permitted to read the data from the entry (e.g., the telemetry data), but not metadata 718 (e.g., the status and/or time stamp associated with the entries of the space allocated for the device ID). It is noted however, that embodiments in which metadata 718 may be read are also possible and contemplated.

Method for Operating a System with Push Telemetry:

FIG. 8 is a flow diagram of one embodiment of a method for operating a system in which telemetry data is pushed from a number of ICs to a central location. Method 800 may be carried out by various embodiments of an apparatus as discussed above, as well as with some of the apparatus embodiments discussed below. Embodiments of an apparatus capable of carrying out Method 800 but not otherwise disclosed herein are also considered to fall within the scope of this disclosure.

Method 800 includes transmitting telemetry data to a first integrated circuit of a plurality of integrated circuits from other ones of the plurality of integrated circuits, wherein the first integrated circuit is configured to receive the telemetry data via an external interface (block 805). The method further includes storing the telemetry data, by a first control circuit of the first integrated circuit, in a first table circuit, wherein the storing comprises the first control circuit storing the telemetry data in respective table entries of the first table circuit, based on which of the other ones of the plurality of integrated circuits transmitted the telemetry data (block 810).

In various embodiments, the integrated circuit includes a plurality of component circuits. In such embodiments, the method includes transmitting telemetry data from ones of the plurality of component circuits to a second control circuit of the integrated circuit, the second control circuit having a second table circuit, and storing the telemetry data transmitted from the ones of the plurality of component circuits in a second table circuit. The method may also include operating the first control circuit any time the integrated circuit is receiving power and selectively powering the second control circuit on and off during a time the integrated circuit is receiving power.

In some embodiments, the method includes generating, using an address remap circuit, an address to an entry in the first table circuit based on an identifier of a given one of the plurality of other integrated circuits that transmitted a transaction for the first table circuit, the transaction including a second address. The method may also include mapping the address to the entry, using an address remap circuit, in an update portion of the address space mapped to the first table circuit and updating the entry in response to the address being mapped to the update portion. In response to the transaction being a read transaction, the method further includes mapping the address, using an address remap circuit, in a peek portion of the address space mapped to the first table circuit, wherein the entry, when in the peek portion, is readable without causing an update to a status field of the entry.

Embodiments of the method are also possible and contemplated that include reading data, for a first read transaction, read data from a given entry in the first table circuit using a read portion of and address space mapped to the first table circuit. These embodiments also include modifying a status in a status field of the given entry based on the read transaction using the read portion of the address space that addresses the given entry, and inhibiting modification of the status in the status field of the given entry based on a second read transaction to the given entry using a peek portion of the address space.

System Including Forwarding Circuit for Push Telemetry:

FIG. 9 is a block diagram of one embodiment of a system including a forwarding circuit for conveying telemetry data to a receiving circuit. In the embodiment shown, system 900 includes a table circuit 902 having a number of entries 903. The table circuits are coupled to a number of different component circuits 911. In some embodiments, the component circuits 911 are implemented on the same IC as table circuit 902, while, in other embodiments, the component circuits 911 are implemented on different ICs relative to the table circuit 902. Embodiments are possible and contemplated in which some component circuits 911 are on the same IC as table circuit 902, while other component circuits 911 are on one or more different ICs. The entries 903 of table circuit 902 may store telemetry data that is pushed by various ones of the component circuits 911.

System 900 also includes a forwarding circuit 904 coupled to table circuit 902. The forwarding circuit 902 is configured to transmit telemetry data read from one or more of entries 903 in table circuit 902 to a receiving circuit 906. In the embodiment shown, forwarding circuit 904 transmits the telemetry data in response to one or more trigger conditions that may be programmed therein. For example, the trigger conditions could include the expiration of a timer that causes forwarding circuit 904 to periodically transmit telemetry data from table circuit 902 to receiving circuit 906, with the timer being reset with each transmission. Another example of a trigger condition is the detection that a particular entry 903 of table circuit 902 has been updated (e.g., a new value has been written into the particular entry). Yet another possible trigger condition includes the detection of a specific value in a particular entry 903 (e.g., a temperature value that exceeds a specified threshold value). Generally speaking, any suitable trigger condition may be used to cause forwarding circuit 904 to forward telemetry data from table circuit 902 to receiving circuit 906. This may allow telemetry data to be pushed to receiving circuit 906 without the need for polling or other mechanisms that involve requesting the sending of this telemetry data.

As will be discussed below, in various embodiments, table circuit 902, forwarding circuit 904, and receiving circuit 906 are implemented onto a single semiconductor substrate forming an IC. Such an IC may include an external interface upon which the receiving circuit 906 may transmit telemetry data to another destination (e.g., on another IC). The other destination may be a primary IC within the system to which telemetry data is forwarded, or to another IC that is external to the primary IC.

In other embodiments, table circuit 902 and forwarding circuit 904 may be integrated onto a first semiconductor substrate forming a first IC, while receiving circuit 906 is integrated onto a second semiconductor substrate forming a second IC. It is contemplated that in such embodiments, receiving circuit 906 comprises a second table circuit configured to store the telemetry data. Furthermore, the second table circuit in such embodiments may be further configured to store telemetry data from a second plurality of component circuits integrated on the second integrated circuit. Receiving circuit 906 may also include an address remap circuit similar to that discussed above in reference to FIG. 3. Such an address remap circuit may be configured to map an address space to the second table circuit, The receiving circuit may also include a control circuit configured to write telemetry data received from ones of the second plurality of component circuits to the second table circuit through an update portion of the address space, and further configured to write telemetry data received from the forwarding circuit through a clone portion of the address space that is separate from the update portion.

FIG. 10 is a block diagram of one embodiment of a system on a chip (SoC) with forwarding circuits configured to forward telemetry data from a local dashboard. In the embodiment of FIG. 10, SoC 1000 includes an AON power domain 1010 and at least one gated power domain (GPD) 1020. The AON power domain 1010 includes interface circuits 1013 and 1019 for communicating with devices external to SoC 1000 via external interfaces. In GPD 1020, SoC 1000 includes power manager (PMGR) 1011 having internal dashboard (IDB) 1022. Component circuits 1023, 1024, and 1025 in GPD 1020 are various types of circuits that generate and provide telemetry data to PMGR 1021 as part of their operation. These component circuits may be any type of functional circuit, such as a particular type of processor core, a graphics processor, circuits that implement an on-chip network or communications fabric, and so on. PMGR 1021 may store the telemetry data received from these component circuits in IDB 1022 and may use this data to carry out various control functions when circuits in GPD 1020 are receiving power. It is noted that embodiments are possible and contemplated in which component circuits in other switchable power domains are present and are coupled to provide telemetry data to IDB 1022 when powered on and operating, and may also be subject to control functions performed by PMGR 1021. The various control functions may include (but are not limited to), selecting a performance state having a particular supply voltage and clock frequency for a given circuit component based on thermal output, performance needs, or other metric. It is further noted embodiments are also possible and contemplated in which software agents may also write to a dashboard such as IDB 1022.

In the AON power domain 1010, SoC 1000 includes system management circuit (SMC) 1011, which in turn includes a peripheral dashboard (PDB) 1012. PBD 1012 is configured to store telemetry data provided thereto from circuits external to SoC 1000, such as ICs implemented in various peripheral devices, as well as from software agents in some embodiments. SMC 1011 may, in some cases, carry out various control functions based on the telemetry data stored in PDB 1012, or may send information and/or commands to other devices to perform these functions in some embodiments. In other embodiments, this telemetry data may be forwarded to other locations within a system, as will be discussed below.

SoC 1000 in the embodiment shown also includes a plurality of forwarding circuits and one or more receiving circuits. More particularly, forwarding circuit 1016 is implemented in AON domain 1010 while forwarding circuit 1026 is implemented in GPD 1020. Forwarding circuit 1016 is configured to forward telemetry data stored in PDB 1012, while forwarding circuit 1026 is configured to forward telemetry data that is stored in IDB 1022. Forwarding circuits 1016 and 1026 in the embodiment shown are coupled to forward telemetry data from IDB 1022 to one or both of receiving circuits 1017 or 1027. The receiving circuits may be any circuitry capable of receiving the telemetry data, and may include circuits that utilize this for various functions, including the implementation of control loops. Furthermore, receiving circuits 1017 and 1027 may also be arranged for communication with external circuits. For example, in one embodiment, receiving circuit 1027 may be an off-chip channel circuit configured for communications via an interface circuit (not shown here) coupled to an off-chip channel. Receiving circuit 1017 may be similarly configured in some embodiments. The off-chip channel circuit implemented by receiving circuit 1027 may be configured to receive telemetry data from its correspondingly coupled dashboard and transmit the telemetry data off-chip (off the SoC) via an interface circuit to an external interface. The off-chip channel circuit implemented by receiving circuit 1027 may be configured to stream the telemetry data. Such a configuration may permit the telemetry data to be visible for debug or other analysis purposes, for example. In the embodiment shown, an external receiving circuit 1037 implemented off-chip is also implemented, and may stream telemetry data to another point within the system.

In various embodiments, forwarding circuits 1016 and 1026 are programmable with one or more trigger conditions, the occurrence of which cause them to forward telemetry data from their respectively coupled dashboard circuits. Any trigger conditions may be supported. For example, in an embodiment, a trigger condition may be the expiration of a timer to periodically forward telemetry data. A trigger condition may be the update of a particular table entry with telemetry data, or multiple table entries. A trigger condition may be that a certain number of table entries have been updated with telemetry data. A trigger condition may be a specific value of telemetry data in a given table entry. Other trigger conditions not explicitly disclosed herein are also possible and contemplated. A trigger condition may also comprise a combination of conditions, and any desirable combination of conditions may be used to trigger the forwarding of telemetry data in various embodiments.

FIG. 11 is a block diagram of an embodiment of a system having multiple ICs with forwarding circuits. In the embodiment shown, system 1100 includes Soc 1101 and SoC 1102. SoC 1101 acts as a primary SoC in this example, while SoC 1102 is a secondary SoC. SoC 1101 and 1102 are coupled to one another via a switch fabric 1150 over a die-to-die interface, and are implemented in this embodiment on separate semiconductor substrates that form separate ICs. Although not explicitly shown, system 1100 may include other components implemented on other ICs as well.

SoC 1101 in the embodiment shown includes SMC 1111, with PDB 1112 implemented therein, both within AON power domain 1110. SoC 1101 also includes, in GPD 1120, PMGR 1121, which includes IDB 1122. SoC 1102 includes PMGR 1141 having IDB 1142 implemented therein, within the switchable power domain implemented by GPD 1060. Also included on SoC 1002 is SMC 1131, which includes PDB 1132.

Forwarding circuit 1146 in the embodiment shown is configured to forward telemetry data from IDB 1142 in SoC 1102 to IDB 1122 in SoC 1101 (and thus, SoC 1101 is a receiving circuit in this example) in response to one or more trigger conditions that may be programmed therein. Forwarding circuit 1136 in the embodiment shown is configured to forward telemetry data from PDB 1132 to PDB 1122 in SoC 1101. SoCs 1101 and 1102 may also include respective interface circuits such as that discussed above in reference to FIG. 3, with these interface circuits including corresponding address remap circuits for mapping the addresses of received telemetry data into the receiving dashboard circuits. With respect to the transmission of data from SoC 1102 to SoC 1101, the clone space (as discussed above) of the respective receiving dashboards may be used in mapping the addresses of received telemetry data. By carrying out the forwarding operation from SoC 1102 to respective dashboards in SoC 1101, telemetry data may be consolidated in the latter.

Furthermore, the dashboards of SoC 1101 may also consolidate telemetry data from other ICs of system 1100 that are not otherwise shown here.

SoC 1101 also includes forwarding circuits 1116 and 1126 (in AON domain 1110 and GPD 1120, respectively). These forwarding circuits may be used to forward telemetry data from their respective dashboards to other circuits, including circuits external to SoC 1101. For example, the forwarding circuits 1116 and 1126 may be coupled to a debug interface that allows debug-related telemetry data to be forwarded to an external location for analysis. Since telemetry data from system 1101 is consolidated into the dashboard circuits of SoC 1101, the ability to use forwarding circuits 1116 and 1126 may obviate any need to provide a separate channel to a debug interface for SoC 1102.

System 1100 also includes an example forwarding circuit 1166 that is external to either of the SoCs. This forwarding circuit 1166 is coupled to receive telemetry data from PDB 1132, and may forward this data to another part of the system that is not shown here (e.g., a power management IC). Generally speaking, forwarding circuits may be implemented on the SoCs or external thereto in order to convey telemetry data to other portions of the system.

Method for Operating IC with Forwarding Circuit:

FIG. 12 is a flow diagram of one embodiment of a method for operating a system in which at least one IC includes a forwarding circuit. Method 1200 may be carried out by various ones of the apparatus embodiments discussed above. Apparatus embodiments not explicitly disclosed herein, but capable of carrying out Method 1200, are also considered to fall within the scope of this disclosure.

Method 1200 includes storing, in respective table entries of a first table circuit, telemetry data provided by ones of a plurality of component circuits (block 1205). The method further includes detecting an occurrence of one or trigger conditions in a forwarding circuit (block 1210) and transmitting telemetry data from one or more table entries in the first table circuit, by the forwarding circuit, to a receiving circuit based on detecting the occurrence of the one or more trigger conditions (block 1215).

In various embodiments, storing, in a second table circuit of the receiving circuit, the telemetry data transmitted by the forwarding circuit. In some embodiments, the transmitting the telemetry data includes the forwarding circuit transmitting the telemetry data from a first semiconductor substrate forming a first integrated circuit to a second semiconductor substrate forming a second integrated circuit, wherein the second integrated circuit includes the second table circuit. However, embodiments are possible and contemplated in which the forwarding circuit as well as the first and second table circuits are on the same semiconductor substrate are also possible and contemplated.

The method may also include mapping, using an address remap circuit, an address space to the second table circuit. Based on the mapping, the method further includes writing, using a control circuit, telemetry data to the second table circuit through a clone portion of the address space. The method may also include writing, using the control circuit, additional telemetry data to the second table circuit received from a plurality of component circuits of the second integrated circuit through an update portion of the address space, wherein the additional data may be from the same IC as the table circuit.

Various trigger conditions may be used to cause the forwarding of data by the forwarding circuit. In one embodiment, the one or more trigger conditions include expiration of a timer used to cause the forwarding circuit to periodically forward telemetry data. The one or more trigger conditions may also include an update of a particular entry in the first table circuit.

Example System:

Turning next to FIG. 13, a block diagram of one embodiment of a system 1300 is shown that may incorporate and/or otherwise utilize the methods and mechanisms described herein. In the illustrated embodiment, the system 1300 includes at least one instance of a system on chip (SoC) 1306 which may include multiple types of processing units, such as a central processing unit (CPU), a graphics processing unit (GPU), or otherwise, a communication fabric, and interfaces to memories and input/output devices. In some embodiments, one or more processors in SoC 1306 includes multiple execution lanes and an instruction issue queue. In various embodiments, SoC 1306 is coupled to external memory 1302, peripherals 1304, and power supply 1308.

A power supply 1308 is also provided which supplies the supply voltages to SoC 1306 as well as one or more supply voltages to the memory 1302 and/or the peripherals 1304. In various embodiments, power supply 1308 represents a battery (e.g., a rechargeable battery in a smart phone, laptop or tablet computer, or other device). In some embodiments, more than one instance of SoC 1306 is included (and more than one external memory 1302 is included as well).

The memory 1302 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

Various embodiments of system 1300 may implement the various push telemetry mechanisms discussed above. For example, SoC 1303 in the embodiment shown may include a table circuit implemented in an always-on section, while the various peripherals 1304 may include one or more ICs that forward telemetry data thereto. The ICs of peripherals 1304 may include forwarding circuits configured to forward telemetry data to the table circuit of SoC 1303 in response to various trigger conditions. Additionally, SoC 1303 may include an additional table circuit implemented in gate-able power domain, which may store telemetry data received from one or more component circuits that are also in a gate-able power domain.

The peripherals 1304 include any desired circuitry, depending on the type of system 1300. For example, in one embodiment, peripherals 1304 includes devices for various types of wireless communication, such as Wi-Fi, Bluetooth, cellular, global positioning system, etc. In some embodiments, the peripherals 1304 also include additional storage, including RAM storage, solid state storage, or disk storage. The peripherals 1304 include user interface devices such as a display screen, including touch display screens or multi-touch display screens, keyboard or other input devices, microphones, speakers, etc.

As illustrated, system 1300 is shown to have application in a wide range of areas. For example, system 1300 may be utilized as part of the chips, circuitry, components, etc., of a desktop computer 1310, laptop computer 1320, tablet computer 1330, cellular or mobile phone 1340, or television 1350 (or set-top box coupled to a television). Also illustrated is a smartwatch and health monitoring device 1360. In some embodiments, smartwatch 1360 may include a variety of general-purpose computing related functions. For example, smartwatch 1360 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1300 may further be used as part of a cloud-based service(s) 1370. For example, the previously mentioned devices, and/or other devices, may access computing resources in the cloud (i.e., remotely located hardware and/or software resources). Still further, system 1300 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 13 is the application of system 1300 to various modes of transportation. For example, system 1300 may be used in the control and/or entertainment systems of aircraft, trains, buses, cars for hire, private automobiles, waterborne vessels from private boats to cruise liners, scooters (for rent or owned), and so on. In various cases, system 1300 may be used to provide automated guidance (e.g., self-driving vehicles), general systems control, and otherwise. These any many other embodiments are possible and are contemplated. It is noted that the devices and applications illustrated in FIG. 13 are illustrative only and are not intended to be limiting. Other devices are possible and are contemplated.
Computer Readable Medium:

FIG. 14 is a block diagram illustrating one embodiment of a non-transitory computer-readable medium storing information regarding an embodiment of an SoC as disclosed herein. In the embodiment shown, computer accessible storage medium 1400 is any non-transitory medium such as flash memory, disk memory, and so on, that may store information regarding an SoC design 1404. The information regarding the SoC design 1404 may, in various embodiments, include information regarding the physical structure and layout of SoC design 1404 as well as information regarding its functioning. The information may be used for simulating the operation of SoC design 1404. Furthermore, in various embodiments, the information may be used in a fabrication system to manufacture physical instances of SoC design 1404.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a particular integrated circuit including:
      at least one interface circuit configured to communicate on an external interface with a plurality of other integrated circuits;
      a first table circuit;
      a first control circuit coupled to the at least one interface circuit and configured to:
         receive telemetry data pushed to the at least one interface circuit by ones of the plurality of other integrated circuits, wherein the telemetry data includes information indicative of current functional conditions of the ones of the plurality of other integrated circuits; and
         store the telemetry data pushed by the ones of the plurality of other integrated circuits over the external interface in respective table entries of the first table circuit, based on which of the ones of the plurality of other integrated circuits transmitted the telemetry data; and
      at least one processor configured to, for a first read transaction, read data from the first table circuit using a read portion of an address space mapped to the first table circuit, wherein a given entry in the first table circuit includes a status field,
      wherein the first control circuit is further configured to modify a status in the status field based on the first read transaction using the read portion of the address space that addresses the given entry, and
      wherein the first control circuit is configured to inhibit modification of the status in the status field based on a second read transaction to the given entry using a peek portion of the address space.

2. The apparatus of in claim 1, wherein the particular integrated circuit further includes:

a plurality of component circuits; and a second control circuit comprising a second table circuit, wherein the second control circuit is configured to store, in the second table circuit, second telemetry data transmitted from ones of the plurality of component circuits.

3. The apparatus of in claim 2, wherein the ones of the plurality of component circuits and the second control circuit are included in one or more power domains of the particular integrated circuit that are selectively powered on and off during a time that the particular integrated circuit receives power.

4. The apparatus of claim 2, and wherein the first control circuit and the at least one interface circuit are included in a second power domain that operates at any time that the particular integrated circuit receives power.

5. The apparatus of claim 1 wherein the at least one interface circuit comprises an address remap circuit configured to generate an address to an entry in the first table circuit based on an identifier of a given one of the plurality of other integrated circuits that transmitted a transaction for the first table circuit, the transaction including a second address.

6. The apparatus of in claim 5 wherein, in response to the transaction being a write transaction, the address remap circuit is configured to map the address to the entry in an update portion of the address space mapped to the first table circuit, wherein the entry is updated in response to the address to the entry being mapped to the update portion.

7. The apparatus of in claim 6 wherein, in response to the transaction being a read transaction, the address remap circuit is configured to map the address to the entry in the peek portion of the address space mapped to the first table circuit, wherein the entry, when in the peek portion, is readable without causing an update to a first status field of the entry.

8. The apparatus of in claim 1 wherein the status field includes a new bit, and wherein the first control circuit is further configured to:

set the new bit when the given entry is updated; and clear the new bit when the given entry is read.

9. A method comprising:

collecting, by a plurality of integrated circuits, telemetry data that includes information indicative of current functional conditions of the plurality of integrated circuits;

transmitting, by a subset of the plurality of integrated circuits to a first integrated circuit of the plurality of integrated circuits, respective portions of the telemetry data, wherein the first integrated circuit is configured to receive the telemetry data via an external interface; and storing the telemetry data, by a first control circuit of the first integrated circuit, in a first table circuit, wherein the storing comprises the first control circuit storing the telemetry data in respective table entries of the first table circuit, based on which of the subset of the plurality of integrated circuits transmitted the telemetry data;

reading, for a first read transaction, read data from a given entry in the first table circuit using a read portion of an address space mapped to the first table circuit;

modifying a status in a status field of the given entry based on the first read transaction using the read portion of the address space that addresses the given entry; and inhibiting the modification of the status in the status field of the given entry based on a second read transaction to the given entry using a peek portion of the address space.

10. The method of claim 9, wherein the first integrated circuit includes a plurality of component circuits, and wherein the method further comprises:

transmitting first telemetry data from ones of the plurality of component circuits to a second control circuit of the first integrated circuit, the second control circuit having a second table circuit; and storing the first telemetry data transmitted from the ones of the plurality of component circuits in the second table circuit.

11. The method of claim 10, further comprising:

operating the first control circuit any time the first integrated circuit is receiving power; and selectively powering the second control circuit on and off during a time the first integrated circuit is receiving power.

12. The method of claim 9, further comprising generating, using an address remap circuit, an address to an entry in the first table circuit based on an identifier of a given one of the subset of the plurality of integrated circuits that transmitted a transaction for the first table circuit, the transaction including a second address.

13. The method of claim 12 further comprising, in response to the transaction being a write transaction:

mapping the address to the entry, using the address remap circuit, in an update portion of the address space mapped to the first table circuit; and updating the entry in response to the address being mapped to the update portion.

14. The method of claim 12 further comprising, in response to the transaction being a read transaction:

mapping the address, using the address remap circuit, in the peek portion of the address space mapped to the first table circuit, wherein the entry, when in the peek portion, is readable without causing an update to a first status field of the entry.

15. The method of claim 9, further comprising:

wherein the status field includes a new bit, and wherein the first control circuit is further configured to:

setting the new bit included in the given entry based on an update to the given entry; and clearing the new bit based on the given entry is read.

16. A system comprising:

a plurality of integrated circuits configured to:

collect first telemetry data that includes information indicative of current functional conditions of ones of the plurality of integrated circuits; and push the first telemetry data to an external interface; and a system-on-a-chip (SoC) that includes:

a plurality of component circuits configured to collect second telemetry data that includes information indicative of current functional conditions of the SOC;

an interface circuit configured to communicate with the plurality of integrated circuits through the external interface;

a first control circuit coupled to the interface circuit, the first control circuit having a first table circuit, wherein the first table circuit is configured to store, in respective entries of the first table circuit, the first telemetry data transmitted by the ones of the plurality of integrated circuits based on which of the ones of the plurality of integrated circuits transmitted the first telemetry data; and at least one processor configured to, for a first read transaction, read data from the first table circuit using a read portion of an address space mapped to the first table circuit, wherein a given entry in the first table circuit includes a status field; and wherein the first control circuit is configured to:

modify a status in the status field based on the first read transaction using the read portion of the address space that addresses the given entry; and inhibit the modification of the status in the status field based on a second read transaction to the given entry using a peek portion of the address space.

17. The system of claim 16, wherein the SoC further includes: a second control circuit having a second table circuit, wherein the second control circuit is configured to store, in the second table circuit, the second telemetry data.

18. The system of claim 17, wherein the first control circuit is implemented in a first power domain and is configured to operate whenever the SoC is receiving power, and wherein the second control circuit is implemented in a second power domain and is configured to be selectively powered on and off when the SoC is receiving power.

19. The system of claim 16, wherein the interface circuit includes an address remap circuit configured to generate an address to an entry in the first table circuit based on an identifier of a given one of the ones of the plurality of integrated circuits that transmitted a transaction for the first table circuit, the transaction including a second address.

\* \* \* \* \*